United States Patent [19]

Bartmann

[11] Patent Number: 4,876,310
[45] Date of Patent: Oct. 24, 1989

[54] HYDROCARBON RESIN/POLYPHENYLENE ETHER COMBLIKE POLYMERS, METHODS OF PRODUCING THESE POLYMERS, AND THEIR MIXTURES WITH POLYPHENYLENE ETHERS

[75] Inventor: Martin Bartmann, Recklinghausen, Fed. Rep. of Germany

[73] Assignee: Hüls Aktiengesellschaft, Marl, Fed. Rep. of Germany

[21] Appl. No.: 834,423

[22] Filed: Feb. 28, 1986

[30] Foreign Application Priority Data

Mar. 14, 1985 [DE] Fed. Rep. of Germany ....... 3509093

[51] Int. Cl.⁴ ..................... C08F 16/12; C08F 71/04
[52] U.S. Cl. .................................... 525/149; 524/335; 525/69; 525/132; 525/152; 525/534; 525/905
[58] Field of Search ................ 525/152, 534, 132, 149

[56] References Cited

U.S. PATENT DOCUMENTS 3,658,949  4/1972  Nakashio et al. .

FOREIGN PATENT DOCUMENTS 101873  7/1983  European Pat. Off. .

52-9098  7/1975  Japan .

Primary Examiner—Jabob Ziegler
Attorney, Agent, or Firm—Oblon, Spivak, McClelland, Maier & Neustadt

[57] ABSTRACT

A hydrocarbon resin/polyphenylene ether comblike polymer and mixtures of these with polyphenylene ethers is disclosed. The comblike polymers are obtained by oxidative coupling reactions of ortho-substituted phenols and hydrocarbons with side groups (on the hydrocarbons) of formula

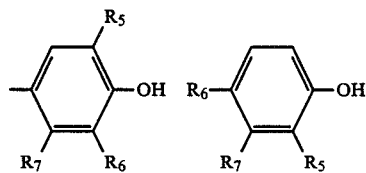

where $R_5$ and $R_6$ are each halogen, phenyl, or n-alkyl with 1–4 C atoms, and $R_7$ is a hydrogen atom, a halogen atom, a phenyl group or an n-alkyl group with 1–C atoms.

23 Claims, 2 Drawing Sheets

HYDROCARBON RESIN/POLYPHENYLENE ETHER COMBLIKE POLYMERS, METHODS OF PRODUCING THESE POLYMERS, AND THEIR MIXTURES WITH POLYPHENYLENE ETHERS

BACKGROUND OF THE INVENTION

1. Field of the Invention

The present invention relates to novel hydrocarbon resin/polyphenylene ether comblike polymers, methods of preparing such polymers, and mixtures of these with polyphenylene ethers.

2. Discussion of the Background

Polyphenylene ethers, particularly poly(2,6-dimethylphenylene ether) (PPE), and methods for their preparation are known. See, for example, Buehler, "Special Plastics" (in German), pub. Akademieverlag, Berlin, 1978; and U.S. Pat. Nos. 3,306,874 and 3,306,875. And, for example, the preparation of PPEs by the oxidative coupling of ortho-substituted phenols mediated by copper-amine complexes in the presence of oxygen or oxygen-containing gas mixtures has proven itself to be an industrially feasible process.

Polyphenylene ethers are thermoplastics which are produced industrially in high volume. They are characterized by having high melting viscosities and high softening points. They are suitable for numerous technical applications requiring high heat deflection temperature. However, some properties of polyphenylene ethers are undesirable for certain technical applications. For example, molded parts made of polyphenylene ethers are excessively brittle because of their low impact strength. Processing these as melts has thus far not been industrially practicable to a great extent because the high temperatures required result in decomposition reactions which give the product an undesirable coloration.

It is known that the properties of polyphenylene ethers can be improved by admixture with other polymers. Thus, it is known from U.S. Pat. No. 3,383,435 and German AS 21 19 301 that the processibility of molten polyphenylene ethers can be improved by mixing-in polystyrene resins, preferably rubber-modified high impact polystyrenes (HIPS). In general, however, the properties of these materials in molding compounds of this type are not satisfactory. The molded pieces are frequently inadequate in impact strength and in heat deflection temperature.

Accordingly it has been proposed to increase the impact strength by addition of elastomeric block mixed polymers. Thus, e.g., German AS 19 32 234 and German OSs 24 34 848, 27 13 509 and 27 50 515 describe molding compounds comprised of styrene polymers, polyphenylene ethers and added compounds comprising differently structured hydrogenated or unhydrogenated block mixed polymers. The latter are primarily polymerized vinylaromatic hydrocarbon blocks and polymerized conjugated diene polymer blocks. In addition, U.S. Pat. Nos. 3,658,945, 3,943,191, 3,959,211, 3,974,235, 4,101,503, 4,101,504, 4,101,505 and 4,102,850 describe methods where the polystyrene component is modified by grafting with an ethylene-alpha-olefin-diene terpolymer. However, these methods have the drawbacks that it is costly to prepare the block mixed polymers and the graft product, and that the addition of these components is associated with a reduction in heat deflection temperature.

German OS 21 07 935 describes a method for preparing a mixture from a polyphenylene ether and a rubber. According to this method, a 2,6-disubstituted phenol is polymerized in the presence of a rubber such as, e.g., polyisoprene. In this way a product is obtained in which the identities of the mixing components—the polyphenylene ether and the rubber—are retained. This is demonstrated in very clear fashion by the fact that the components of the mixture can be re-isolated by suitable measures. For example, the mixture can be first dissolved in a suitable solvent and then a separation can be carried out by addition of a second solvent which does not dissolve one of the two components. This is also applicable for fine-particle powder mixtures comprised of polyphenylene ethers and rubber, which mixtures are obtained according to German Pat. No. 21 11 043.

Polyphenylene ethers and hydrocarbon resins are only slightly compatible with each other. Thus, addition of polyethylenes to polyphenylene ethers and to mixtures of polyphenylene ethers with polystyrene resins are limited to very small quantities of the added polyethylenes in order to prevent embrittlement and delamination (see European OS 0,080,666, p. 2, lines 4–10). The only improvement achieved thus far has been through the addition of compatibility-promoting agents, such as styrene-butadiene block copolymers.

According to a more recent method, 2,6-disubstituted phenols are oxidatively coupled in the presence of special manganese-amine catalysts, where the amino components are incorporated in the resulting polymer. The functionalized polyphenylene ethers obtained can be grafted with unsaturated compounds at elevated temperatures (see European OS 0,101,873). This method is accompanied by the risk of producing insoluble gel-like materials—as documented in the Examples, infra. In any event, the grafting method described is not likely to be industrially practicable because it is applicable only to specially prepared functionalized polyphenylene ethers.

Finally, it is known from German OS 17 45 201 that the chain length of polyphenylene ethers can be regulated by adding to the reaction mixture a phenol substituted by low molecular weight alkyl groups in positions 2, 4 and 6.

There is therefore a strongly felt need for a hydrocarbon resin component which is compatible with polyphenylene ethers. The compatible component should be facile to prepare, and should not reduce the heat deflection temperature of the product, cause embrittlement or delamination, or cause unwanted discoloration (e.g., producing insoluble materials). There is likewise a strongly felt need for a polyphenylene ether product containing such hydrocarbon resin.

SUMMARY OF THE INVENTION

Accordingly, it is an object of this invention to provide a new hydrocarbon resin component which is compatible with polyphenylene ethers.

It is another object of this invention to provide a new hydrocarbon resin component which is compatible with polyphenylene ethers and which is facile to prepare.

It is another object of this invention to provide a new hydrocarbon resin component which is compatible with polyphenylene ethers and which does not deteriorate the heat deflection temperature of the product.

It is another object of this invention to provide a new hydrocarbon resin component which is compatible with polyphenylene ethers and which does not cause embrittlement, delamination or unwanted discoloration.

It is another object of this invention to provide a method for synthesizing a novel polyphenylene ether containing a hydrocarbon resin of this invention.

It is another object of this invention to provide novel mixture of a polyphenylene ether and a hydrocarbon resin/polyphenylene ether comblike polymer.

The present inventors have now surprisingly found that all of the above objects are surprisingly satisfied with the discovery that functionalized hydrocarbon resins which are obtained from alkylated phenols and unsaturated hydrocarbon resins and having free phenol groups can be employed as co-monomers in the oxidative coupling of ortho-substituted phenols. The resulting reaction product is made up of a mixture of a polyphenylene ether and a comblike polymer with a hydrocarbon resin as the main chain and polyphenylene ether groups as the side chain. This combination polymer can also be easily prepared separately.

The present invention thus provides a method for preparing polymers with recurring units of formula:

This method is characterized by using an oxidative coupling reaction of ortho-substituted phenols (Component I) in the presence of a 2,4,6-trisubstituted phenol (Component II) and a copper-amine catalyst. A trisubstituted phenol component (Component II) containing a hydrocarbon resin with side groups of formulae

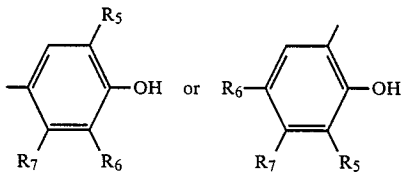

is employed. The groups $R_5$, $R_6$ and $R_7$ are each independently a halogen atom, such as chlorine, bromine or iodine, a phenyl group, or an n-alkyl group with up to 6 carbon atoms, preferably a methyl group. $R_7$ may alternatively be a hydrogen atom.

The present invention also provides novel hydrocarbon resin/polyphenylene ether comblike polymers and a novel mixture of a phenylene ether and a hydrocarbon resin polyphenylene either comblike polymer, both obtainable in accordance with the above method.

BRIEF DESCRIPTION OF THE DRAWINGS

A more complete appreciation of the invention and many of its attendant advantages will be readily obtained as the same becomes better understood by reference to the following detailed description when considered in connection with the accompanying figures, wherein.

DETAILED DESCRIPTION OF THE PREFERRED EMBODIMENTS

Figure 1:
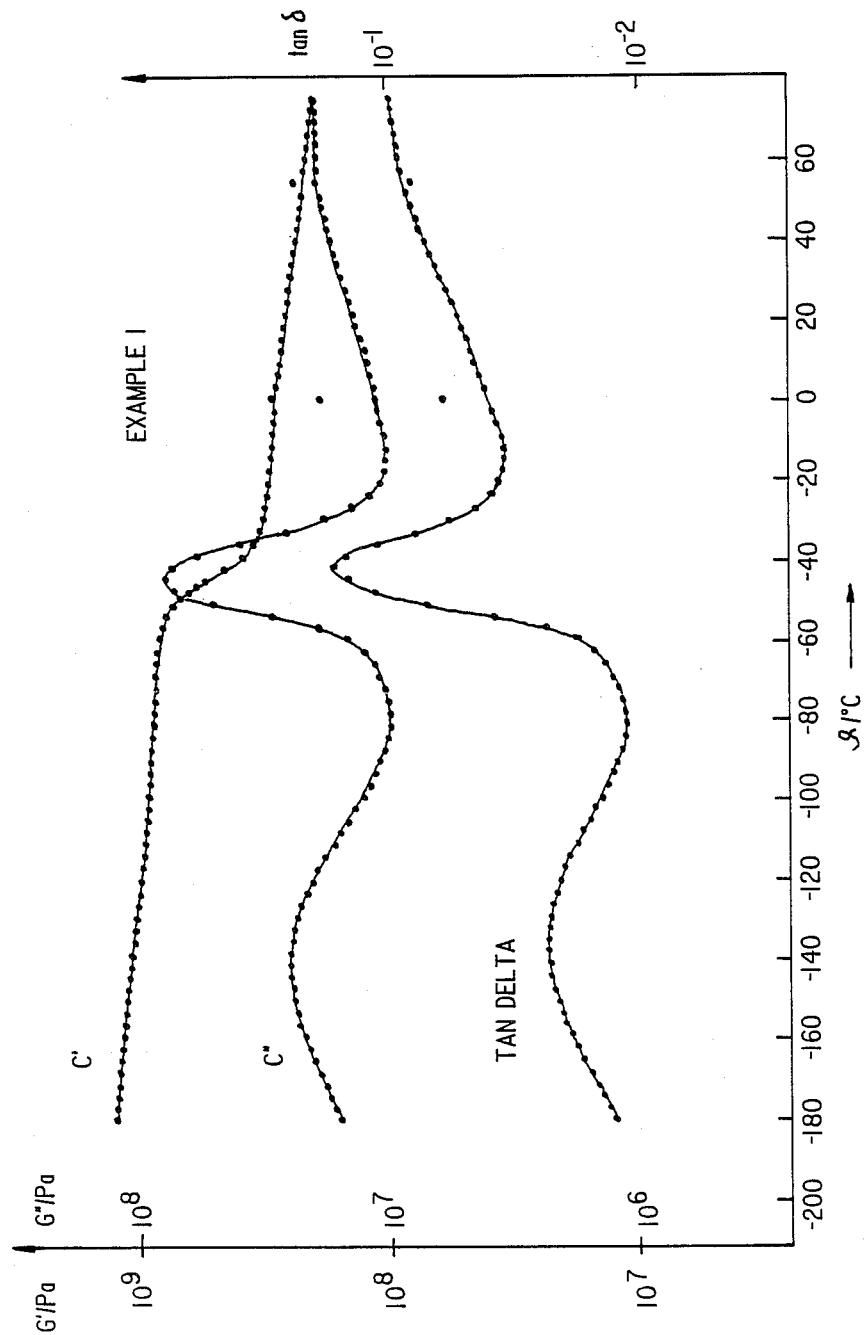
FIGS. 1 and 2 show the torsion oscillation spectra (indicating elasticity) for compressed plates produced in accordance with the present invention.

The present invention provides a method for preparing polymers having recurring units of formula:

by the oxidative coupling reaction of an orthosubstituted phenol (Component I) in the presence of a 2,4,6-trisubstituted phenol (Component II) and a copper-amine catalyst. Such copper-amine catalysts are well known in this art.

Candidates for the substitued phenols (Component I) include compounds of the general formula

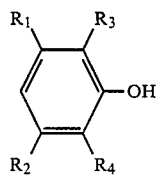

where $R_1$ and $R_2$ are independently a methyl group or a hydrogen atom, preferably hydrogen atom. $R_3$ and $R_4$ are a hydrogen atom and a tertiary alkyl group containing up to 6 C atoms, e.g., tertiary butyl, respectively. Alternatively $R_3$ and $R_4$ each may independently represent an n-alkyl group having up to 6 C atoms. Preferably 2,6-dimethylphenol is employed. Obviously, mixtures of these monomeric phenols may also be employed.

The trisubstituted phenol component (Component II) may be characterized by the formula:

$A(B)_n$, where A is derived from the basic framework of a hydrocarbon resin, and B represents a phenolic side group of formula

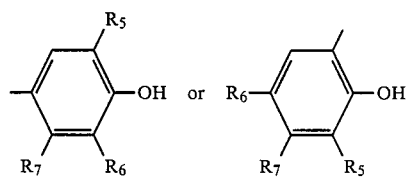

The groups $R_5$, $R_6$ and $R_7$ each represent a halogen atom, e.g., chlorine, bromine or iodine, a phenyl group, or an n-alkyl group having up to 6 C atoms, preferably a methyl group. Group $R_7$ may also alternatively be a hydrogen atom. And n is the number of phenolic side groups bound to one molecule of the hydrocarbon resin. The average value of n is between 2 and 70, preferably between 5 and 30.

The modified hydrocarbon resins (Component II) of general formula $A(B)_n$ are obtained by reacting unsaturated hydrocarbon resins (Component III) with phenols (Component IV) of formula

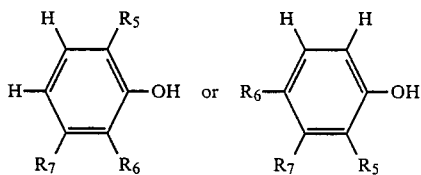

where $R_5$, $R_6$ and $R_7$ have the same meanings as above (see *Angew. Macromol. Chem.*, 24, 205 (1972) and 74, 17 (1978)). Preferably, $R_5$ and $R_6$ each represent a methyl group and $R_7$ represents a hydrogen atom.

The addition of the phenol to the unsaturated hydrocarbon resin is carried out in customary fashion in the presence of an acid. Suitable acids include, e.g., sulfuric, perchloric, p-toluenesulfonic, methanesulfonic and benzenesulfonic. Methanesulfonic acid is preferred.

Suitable unsaturated hydrocarbon resins (Component III) have a molecular weight of 1,000 to 1,000,000, preferably 50,000 to 500,000. Preferably the double bonds of the hydrocarbon resin are not conjugated with each other. On average, the maximum number of double bonds should be 20 per 100 carbon-carbon bonds. As a rule there is at least one double bond. Suitable such unsaturated hydrocarbon resins include terpolymers of ethylene, propylene, and some diene (such terpolymers are also called "EPDM" resins). A terpolymer of ethylene, propylene and ethylidenenorbornene is particularly suitable. Polyalkenylenes obtained by ring-opening polymerization of a cyclic olefin with 5 to 12 C atoms, particularly polyoctenylenes, are also suitable.

The number n of added phenolic groups per molecule depends on, among other things, the molecular weight and the double bond content of the unsaturated hydrocarbon resin employed.

A mixture of the modified hydrocarbon resin (Component II) described immediately supra and the subsituted phenols (Component I) is subjected to the oxidative coupling reaction. The amount of the modified hydrocarbon resin (Component II) in this mixture is between 1 and 50 wt.%, preferably between 3 and 20 wt.%.

Such a mixture can be prepared by simply combining the two components (Components I and II). It is also possible to react the unsaturated hydrocarbon resin (Component II) initially with an excess of phenol and then to directly subject the resulting reaction mixture to the oxidative coupling reaction. Preferably this oxidative coupling reaction is carried out according to the method of German OSs 32 24 692 and 33 13 864 (U.S. patent application No. 4,429,106 and U.S. patent application No. 582,711, filed Feb. 23, 1984, now U.S. Pat. No. 4,537,948, respectively), and German patent application No. P 33 32 377.1 (U.S. patent application Ser. No. 632,125, filed July 18, 1984, now U.S. Pat. No. 4,659,803). These references are all hereby incorporated by reference.

The solutions of polyphenylene ether and the hydrocarbon resin/polyphenylene ether comblike polymer obtained by oxidative coupling can be worked up according to the usual methods, e.g., by common precipitation by means of addition of a precipitating agent; or by direct isolation methods (spray drying or hot-water comminution); or directly by means of evaporation concentration by degassing, according to German patent application No. P 33 37 629.8 (U.S. patent application Ser. No. 657,247, filed Mar. 10, 1984, now abandoned) (entitled "Method for preparing thermoplastic molding compounds containing polyphenylene ethers"). This reference is hereby incorporated by reference.

From the thus obtained mixture which contains only the polyphenylene ether and the hydrocarbon resin/polyphenylene ether comblike polymer, the latter can be separated out as follows:

The mixture is dissolved in a solvent which can dissolve both components. Such solvents included toluene, benzene, ethylbenzene, xylene, chloroform, chlorobenzene or dichlorobenzene. The preferred solvent is toluene. An anti-solvent, i.e., a precipitating agent which is a solvent in which the polyphenylene ether is insoluble but the comblike polymer is soluble, is added to this solution. Suitable anti-solvents are, e.g., hexane, heptane or cylcohexane. After the polyphenylene ether is separated out, the resulting solution is concentrated by evaporation to recover the comblike polymer.

Another possibility is to start with an organic solution of the reaction product obtained immediately after the oxidative coupling reaction. A precondition for this is that the solvent chosen for the oxidative coupling reaction adequately dissolves the reaction product. Such solvents may be identified from the relevant literature. A particularly suitable such solvent is toluene. The anti-solvent is then added, and the comblike polymer is isolated as described supra.

The comblike polymer itself, and mixtures of it with polyphenylene ethers, are of great interest for the preparation of molding compounds with novel properties.

Other features of the invention will become apparent in the course of the following description of examplary embodiments which are given for illustration of the invention and are not intended to be limiting thereof.

Viscosities were determined with the aid of the J-value, analogously with DIN 53 728, by dissolving 0.5 g of the substance in 100 cc of chloroform.

Hereinafter, the term "dimethylphenol" will be frequently abbreviated "DMP".

EXAMPLE 1

Preparation of a solution of an EPDM resin modified by 2,6-DMP, and further containing 2,6-DMP:

EPDM resin (a copolymer comprising ethylene 48 wt.%, propylene 42 wt.%, and 5-ethylidene-bicyclo[2.2.1]-2-heptene 10 wt.%, having a Mooney viscosity ML (1+4) at 100° C.=45, and having an average molecular weight, $\overline{M}_w$, of about 160,000) in the amount of 2 kg was dissolved in 17.8 g of 2,6-DMP in an inert gas atmosphere at 150° C., under stirring. A solution of 50 g of methanesulfonic acid in 200 g xylene and 200 g 2,6-DMP was added to the initial solution. The mixture was allowed to react for four hours, cooled to 100° C., and then diluted with 50 kg of toluene. After cooling to room temperature, the solution was washed with water until neutral, and then dried over sodium sulfate. The solution obtained in this fashion can be subjected directly to the oxidative coupling reaction for producing a mixture of poly(2,6-dimethyl-1,4-phenylene ether) and an EPDM resin/PPE comblike polymer.

A sample of the solution thus obtained was worked up, and the weight fraction of phenolic side groups in the comb polymer was determined. Based on IR and UV measurements, this fraction was 1.5 wt.%.

EXAMPLE 2

Polycondensation of the solution of an EPDM resin modified by 2,6-DMP, and further containing 2,6-DMP. This solution was obtained according to Example 1:

A mixture of 140 kg toluene, 26 kg methanol, 3.6 kg morpholine, and a solution of 0.2 kg $CuCO_3$ in 0.7 kg hydrobromic acid (48%) was charged into a vessel with a stirrer. The solution prepared in Example 1, comprising 2,6-DMP and modified EPDM resin in toluene, was added over a period of 30 min, under stirring (250 rpm) and with the introduction of an air stream of about 8 $m^3$ $hr^{-1}$. Sixty minutes following the completion of the addition of the solution from Example 1, the polycondensation was interrupted by addition of aqueous acetic acid. The polymer was precipitated by addition of methanol and dried.

Yield 19 kg. J=75 ml/g. NMR spectrum: 22% H aromatic, delta=6.5 (s); 68% H Ar-CH3, delta=2.1 (s); 7% H alkyl-CH2-alkyl, delta=1.3 (m); 3% H alkyl-CH3, delta=0.9 (m). From GPC analysis, the result was a mixture of 75 wt.% PPE and 25 wt.% of a PPE resin-/EPDM combination polymer.

$\overline{M}_w$ (PPE)=ca. 35,000
$\overline{M}_w$ (PPE/EPDM)=ca. 400,000.

EXAMPLE 3

Preparation of a 2,4-DMP-modified EPDM resin:

Two kilograms of the unmodified EPDM resin described in Example 1 was dissolved in 18 kg 1,2-dichlorobenzene under nitrogen at 150° C. Then a mixture of 50 g methanesulfonic acid, 2 kg 1,2-dichlorobenzene and 2 kg 2,4-dimethylphenol was added dropwise to this solution over a period of 15 min. The reaction mixture was held 4 hr at 170°-175° C., cooled, and then thinned by the addition of an equal volume of toluene. The modified EPDM resin was isolated by pouring the thinned mixture into 50 kg methanol. The product which remained after decantation was reprecipitated twice from chloroform solution with methanol, and then dried in vacuum at 80° C.

Yield 1.8 kg, 95%. The phenol content in the product was 2.5 wt.%.

EXAMPLE 4

Polycondensation of a 2,4-DMP-modified EPDM resin with 2,6-DMP:

1.8 kg of the modified EPDM resin obtained according to Example 3 was dissolved in a mixture of 1.6 kg 2,6-DMP and 20 kg toluene, and polycondensed according to Example 5.

Yield 16.7 kg. J-value=100 ml/g. NMR spectrum: 22% H aromatic, delta=6.5 (s); 68% H Ar-CH3, delta=2.1 (s); 7% H alkyl-CH2-alkyl, delta=1.3 (m); 3% H alkyl-CH3, delta=0.9 (m).

EXAMPLE 5

Polycondensation of a solution of 2,6-DMP-modified EPDM resin and 2,6-DMP:

2.7 kg unmodified EPDM resin was reacted with 15.3 kg 2,6-DMP, as per Example 1. The resulting reaction solution was concentrated to a toluene content of 20 liters. The solution thus obtained was added gradually over 30 min to a mixture of 170 kg toluene, 26 kg methanol, 3.6 kg morpholine, and a solution of 0.2 kg copper carbonate in 0.7 kg 48% hydrobromic acid and stirred in a stirred vessel at a rate of 250 rpm, while at the same time 8 m$^3$ hr$^{-1}$ air was passed through the mixture. Sixty minutes after the conclusion of the addition of the above-mentioned toluene solution, the polycondensation was interrupted by ceasing the air supply and simultaneously introducing a mixture of 45 kg water and 5 kg methanol, and instituting the passage of carbon dioxide at the rate of 5 m$^3$ hr$^{-1}$ through the mixture. This gas flow was continued for 15 min. The phases were then separated, the organic phase was washed with 100 kg water at 80° C., followed by phase separation, and the product was then isolated by addition of 200 kg methanol, filtration and drying.

Yield 17 kg. J-value=104 ml/g. NMR spectrum: 20.5% aromatic; 64.2% H Ar-CH3; 10.5% H-alkyl-CH2-alkyl; and 4.5% H alkyl-CH3.

EXAMPLE 6

Preparation of 2,6-DMP-modified polyoctenylene:

A modified polycotenylene was prepared, analogously to Example 3, from 2 kg polyoctenylene, 20 kg o-xylene, 1.6 kg 2,6-DMP, and a mixture comprised of 80 g methanesulfonic acid in 800 g o-xylene and 400 g 2,6-DMP. The polyoctenylene had a J-value of 120 ml/g and trans-content of 80% (i.e., 80 wt.%). Such a product is available commercially under the trade name Vestenamer® 8012 (manufacturer: Huels AG, postal zone D-4370 Marl 1, FRG). Additional characteristic parameters of this product may be found in the article *Kautschuk, Gummi, Kunststoffe* 1981, pp. 185-190, and in the Huels Pamphlet No. 2247, Vestenamer® 8012. Alternatively, the polyoctenylene may be prepared as well. For the preparation, reference is made to the book K. J. Iven, "Olefin Metathesis", pub. Academic Press, pp. 236 ff., 1983.

The reaction temperature was between 145° and 150° C. The product was re-precipitated by first dissolving in toluene and then precipitating with methanol.

Yield 1.8 kg. Phenol content 0.9 wt.%.

EXAMPLE 7

Polycondensation of the 2,6-DMP-modified polyoctenylene obtained according to Example 6, said condensation being with 2,6-DMP:

The modified polyoctenylene obtained according to Example 6 was polycondensed analogously to Example 4.

Yield 17 kg. J-value=59 ml/g.

EXAMPLE 8

Separation of the comblike polymer from mixtures of same with pure polyphenylene ethers:

10 parts by weight of the mixture obtained according to Example 2, comprised of PPE and further of EPDM resin/PPE comblike polymers, was combined with 90 parts by weight toluene, and gently heated. A mixture of hexane and methylcyclohexane in the ratio 1:1 by wt. was added at room temperature. The pure PPE precipitated out at room temperature, and the combination polymer stayed in solution.

The comblike polymers from the mixtures obtained according to Examples 4, 5, and 7 may be separated out in analogous fashion.

COMPARISON EXAMPLE A

A mixture of 9 parts by wt. PPE and 1 part by wt. of the unmodified EPDM resin described in Example 1 was combined with 90 parts by wt. toluene and gently heated. A five-fold volume of a mixture of hexane and methylcyclohexane in the ratio 1:1 by wt. was added at room temperature. The PPE precipitated out, and the unmodified EPDM resin remained dissolved.

EXAMPLE 9

Compressed plates were produced from a mixture comprised of 90 wt.% of the polyphenylene ether obtained according to Example 2 without addition of the modified EPDM resin, and 10 wt.% of the EPDM resin employed in Example 1. The torsion oscillation spectrum (to indicate elasticity) is given in FIG. 1. It is seen that above the glass transition temperature of the EPDM there is a marked reduction in the modulus of elasticity of the physical mixture.

EXAMPLE 10

Figure 2:
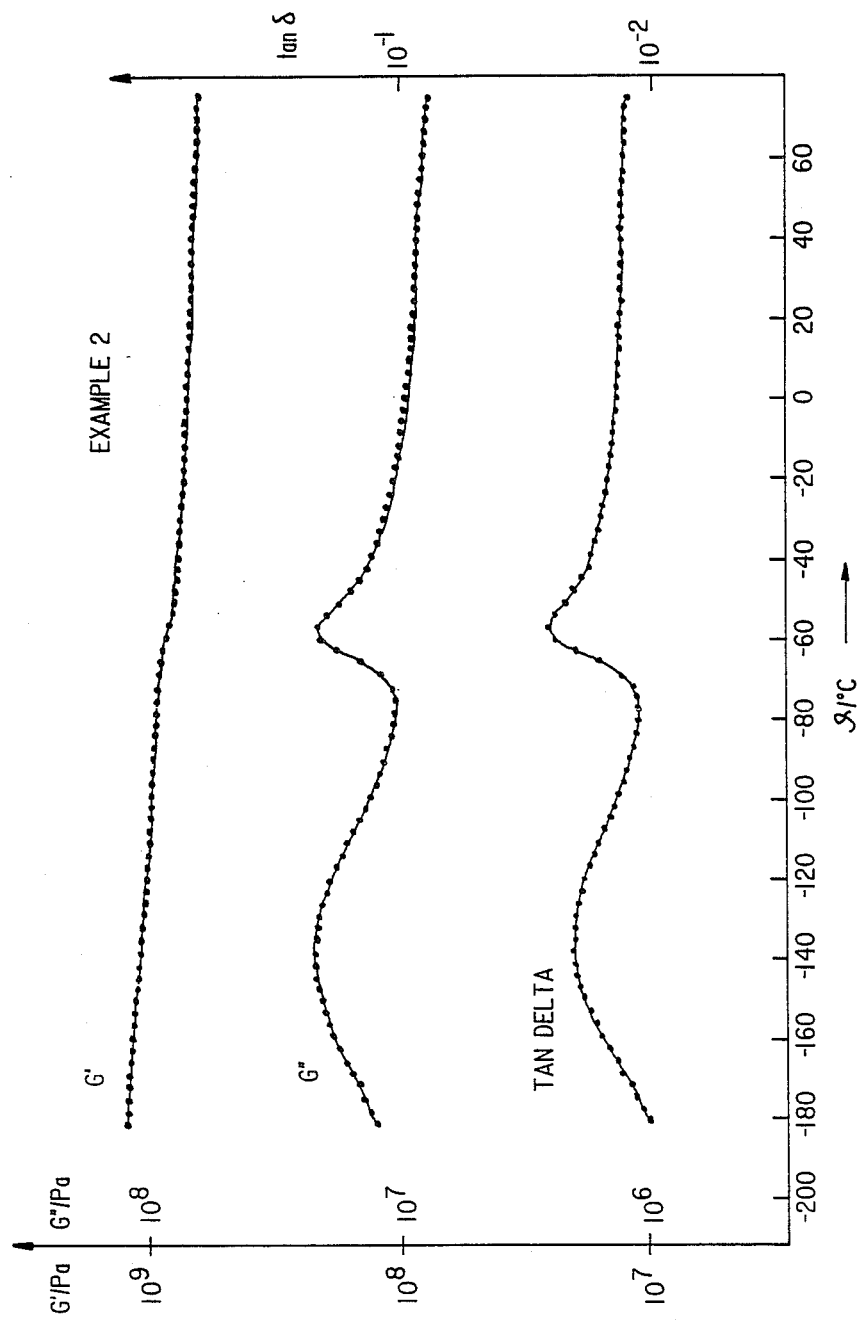

Compressed plates were produced from a mixture of polyphenylene ether and an EPDM/polyphenylene ether comblike polymer obtained according to Example 2. The torsion oscillation spectrum is given to FIG. 2. It is seen that even above the evident glass transition temperature of the EPDM phase the modulus of elasticity of the overall mixture remains substantially unchanged.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for preparing a modified polyphenylene ether polymer, comprising:
   (1) combining (1a) an ortho-substituted phenol, (1b) a copper amine oxidative coupling catalyst, and (1c) a hydrocarbon resin having at least one side group of the formulae

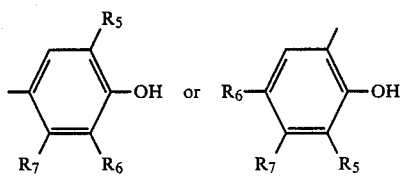

wherein $R_7$ is independently a hydrogen atom and $R_5$, $R_6$ and $R_7$ are each independently a halogen atom, a phenyl group, or a $C_{1-6}$-n-alkyl group, and wherein the hydrocarbon resin is (i) an ethylene-propylene-unconjugated diene terpolymer or a polyalkenylene and (ii) contains at most 20 carbon-carbon double bonds per 100 carbon-carbon bonds; and
   (2) obtaining a mixture of a polyphenylene ether and a hydrocarbon resin/polyphenylene ether comblike polymer.

2. A method for preparing a modified polyphenylene ether polymer, comprising:
   (1) reacting, in the presence of an acid, a hydrocarbon resin with at least one phenol of the formulae:

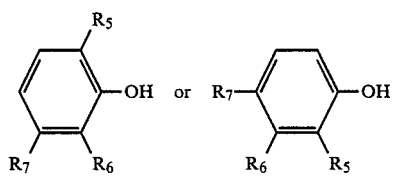

wherein $R_7$ is independently a hydrogen atom and $R_5$, $R_6$ and $R_7$ are each independently a halogen atom, a phenyl group, or a $C_{1-6}$-n-alkyl group, and wherein the hydrocarbon resin is (i) an ethylene-propylene-unconjugated diene terpolymer or a polyalkenylene and (ii) contains at most 20 carbon-carbon double bonds per 100 carbon-carbon bonds, to obtain a hydrocarbon resin having at least one side group of the formulae:

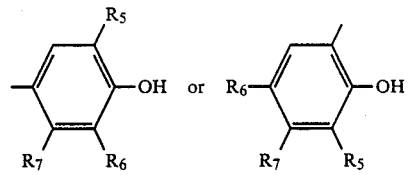

(2) oxidatively coupling an ortho-substituted phenol in the presence of a copper amine catalyst and said hydrocarbon resin having at least one side group; and
   (3) obtaining a mixture of a polyphenylene ether and a hydrocarbon resin/polyphenylene ether comblike polymer.

3. A method for preparing a modified polyphenylene ether polymer, comprising:
   (1) reacting a hydrocarbon resin with at least one phenol of the formula:

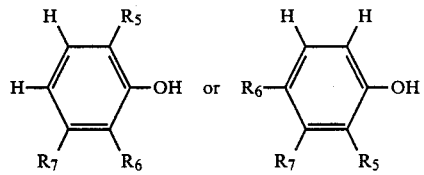

in the presence of an acid which is at least one member selected from the group consisting of sulfuric acid, perchloric acid, p-toluene sulfonic acid, methane sulfonic acid and benzene sulfonic acid, wherein said hydrocarbon resin is (i) an ethylene-propylene-unconjugated diene terpolymer or a polyalkenylene, and (ii) contains at most 20 carbon-carbon double bonds per 100 carbon-carbon bonds, and wherein $R_7$ is independently a hydrogen atom and $R_5$, $R_6$ and $R_7$ are each independently a halogen atoms, a phenyl atom, or a $C_{1-6}$-n-alkyl group;
   (2) obtaining a hydrocarbon resin having at least one side group of the formulae

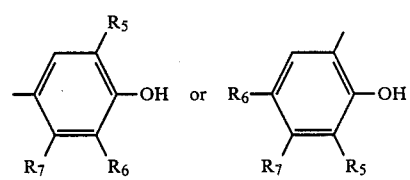

(3) oxidatively coupling an ortho-substituted phenol in the presence of a copper amine catalyst and said hydrocarbon resin having at least one side group of the formulae

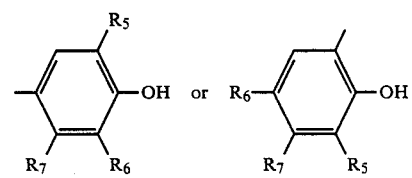

and
   (4) obtaining a mixture of a polyphenylene ether and a comblike polymer having as a basic structure said hydrocarbon resin as a main chain to which is covalently bound polyphenylene ether side chains.

4. The method of claim 3, comprising using an amount of the trisubstituted phenol component product from step (1) which is 1-50 wt.% of the total amount of the ortho-substituted phenol in step (3) and product from step (1).

5. The method of claim 3, comprising using as the 2,4,6-trisubstituted phenol a reaction product obtained by the acid-catalyzed reaction of the unsaturated hydrocarbon resin with a phenol of the formulae

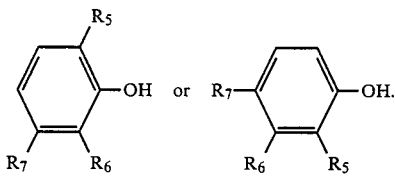

6. The method of claim 1, wherein the unsaturated hydrocarbon resin is an ethylene-propylene-unconjugated diene terpolymer.

7. The method of claim 2, wherein the unsaturated hydrocarbon resin is an ethylene-propylene-unconjugated diene terpolymer.

8. The method of claim 3, wherein the unsaturated hydrocarbon resin is an ethylene-propylene-unconjugated diene terpolymer.

9. The method of claim 1, wherein the unsaturated hydrocarbon resin is an ethylene-propylene-ethylidene norbornene terpolymer.

10. The method of claim 2, wherein the unsaturated hydrocarbon resin is an ethylene-propylene-ethylidene norbornene terpolymer.

11. The method of claim 3, wherein the unsaturated hydrocarbon resin is an ethylene-propylene-ethylidene norbornene terpolymer.

12. The method of claim 1, wherein the unsaturated hydrocarbon resin is a polyalkylene.

13. The method of claim 2, wherein the unsaturated hydrocarbon resin is a polyalkylene.

14. The method of claim 3, wherein the unsaturated hydrocarbon resin is a polyalkylene.

15. The method of claim 1, wherein the unsaturated hydrocarbon resin is a polyoctenylene.

16. The process of claim 2, wherein the unsaturated hydrocarbon resin is a polyoctenylene.

17. The method of claim 3, wherein the unsaturated hydrocarbon resin is a polyoctenylene.

18. The method of claim 1, wherein the side group has the formula:

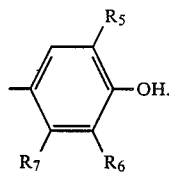

19. The method of claim 1, wherein the side group has the formula:

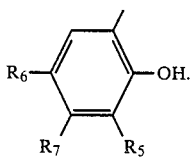

20. The method of claim 2, wherein the side group has the formula:

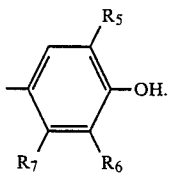

21. The method of claim 2, wherein the side group has the formula:

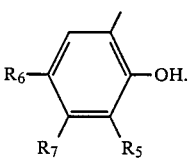

22. The method of claim 3, wherein the side group has the formula:

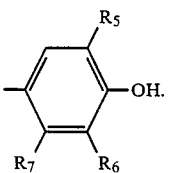

23. The method of claim 3, where the side group has the formula:

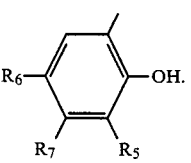

* * * * *